United States Patent [19]

Mizuno et al.

[11] 4,442,339
[45] Apr. 10, 1984

[54] CONSTANT VOLTAGE DC ARC WELDING APPARATUS

[75] Inventors: Takaji Mizuno; Hiroshi Suwahara; Hirohisa Segawa, all of Nagoya, Japan

[73] Assignee: Mitsubishi Denki Kabushiki Kaisha, Tokyo, Japan

[21] Appl. No.: 401,774

[22] Filed: Jul. 26, 1982

[30] Foreign Application Priority Data

Jul. 31, 1981 [JP] Japan .................................. 56-120217

[51] Int. Cl.³ .............................................. B23K 9/10
[52] U.S. Cl. ................................. 219/130.33; 323/285
[58] Field of Search ...................... 219/130.31, 130.32, 219/130.33; 323/285

[56] References Cited

U.S. PATENT DOCUMENTS 4,301,355 11/1981 Kimbrough et al. .......... 219/130.32
4,349,720 9/1982 Makimaa ........................ 219/130.33

*Primary Examiner*—C. C. Shaw
*Attorney, Agent, or Firm*—Sughrue, Mion, Zinn, Macpeak and Seas

[57] ABSTRACT

A DC arc welding apparatus compares the output voltage with an adjustable, preset voltage, and the amplified and integrated difference signal is supplied to a current control circuit together with a current feedback signal. The resulting apparatus operates in a constant voltage mode, thus rendering it applicable to consumable electrode welding. A constant current mode may also be realized, as an alterantive, by bypassing the comparator and feeding the preset voltage directly to the current control circuit.

7 Claims, 10 Drawing Figures

CONSTANT VOLTAGE DC ARC WELDING APPARATUS

BACKGROUND OF THE INVENTION

This invention relates to a DC arc welding apparatus with a switching element.

A conventional DC arc welding apparatus of this type is shown in FIG. 1, wherein reference numeral 1 designates a DC power source including a welding transformer, 2 is a switching element for controlling the output current of the power source including a single power transistor or a plurality thereof connected in parallel, 3 and 4 are the output terminals of the welding apparatus, and 5 is a welding electrode connected to the output terminals 3. A material 7 to be welded (hereinafter referred to as "a base metal") is connected to the output terminal 4, and arcs 6 are established between the electrode 5 and the base metal. A current detecting element 8 such as a shunt resistor is coupled to an output current feedback circuit 9 for amplifying the output signal of the detecting element. A variable resistor 10 across which a constant voltage is applied provides an output current setting signal to a current control circuit, to which the output of feedback circuit 9 is also applied. The current control circuit 11 compares its two inputs, and their amplified difference is supplied to a drive circuit 12 whose output controls the on-off operation of the switching element 2. Reference numerals 13 and 14 designate a flywheel diode and a DC reactor, respectively.

The feedback circuit 9, as shown in FIG. 2, comprises resistors $R_1$ and $R_2$ and an amplifier $IC_1$. The current detected by element 8 is thus amplified $R_2/R_1$ times, to provide an output signal $e_{if}$.

The current control circuit 11, as shown in FIG. 3, comprises resistors $R_3$ through $R_7$, an amplifier $IC_2$, a diode $D_1$, a light emitting diode $D_2$, and a photo-transistor $TR_1$, the l.e.d. and the photo-transistor forming a photo-coupler. If the resistance of $R_3$ is equal to that of $R_4$, the value applied to the non-inverting input terminal of the amplifier $IC_2$ will be $(e_{if}+e_{is})/2$. If the output of the amplifier is represented by $e_2$, then the value $e_1$ applied to the inverting input terminal of the amplifier is:

$$e_1 = \frac{R_6}{R_5 + R_6} \cdot e_2.$$

Accordingly, when $(e_{if}+e_{is})/2 > e_1$, then $e_2 < 0$; and when $(e_{if}+e_{is})/2 < e_1$, then $e_2 > 0$. The comparison signal $e_1$ depends on the value of $e_2$, however, and thus the signal $e_{if}$ from feedback circuit 9 when $e_2$ changes from positive to negative is different in value from the signal $e_{if}$ when $e_2$ changes from negative to positive, which results in a hysteresis characteristic. Accordingly, when the output $e_2$ of the amplifier $IC_2$ is positive ($e_2 > 0$), a forward current flows in the light emitting diode $D_2$ to drive the photo-transistor $TR_1$.

The drive circuit 12, as shown in FIG. 4, comprises a power source E, resistors $R_8$ through $R_{13}$, and transistors $TR_2$ through $TR_5$, these circuit elements forming a multi-stage transistor connection circuit. In response to the operation of the photo-transistor $TR_1$ in the current control circuit, the drive circuit 12 outputs a signal $e_6$ to operate (on and off) the switching element 2.

In the operation of the conventional DC arc welding apparatus shown in FIG. 1, when the switching element 2 is rendered conductive (on) an output current flows, in order, from the DC power source 1 through the element 2, the DC reactor 14, the output terminal 3, the electrode 5, the arc 6, the base metal 7, the output terminal 4, and the current detecting element 8 back to the DC power source.

When the switching element 2 is rendered non-conductive (off), current flows in a loop consisting of the DC reactor 14, the output terminal 3, the electrode 5, the arc 6, the base metal 7, the output terminal 4, the current detecting element 8 and the flywheel diode 13 because of the energy storage effect of the reactor. Furthermore, owing to such effect of the reactor, the current rise and fall characteristic in rendering the switching element 2 conductive and non-conductive has a predetermined time constant. The output signal of the current detecting element 8 is amplified in the feedback circuit 9. At the same time, in the current control circuit 11, the signal $e_{if}$ from the feedback circuit and the signal $e_{is}$ set by the variable resistor 10 are subjected to comparison and amplification, as a result of which two different "high" and "low" signals are selectively applied to the drive circuit 12.

In response to the "high" signal the drive circuit operates to render the switching element 2 conductive, and vice versa. Thus, if a current $I_{ON}$ which causes the switching element 2 to be rendered conductive and a current $I_{OFF}$ which causes the switching element to be rendered non-conductive are controlled by the circuit 11, having a hysteresis characteristic, such that $I_{ON} < I_{OFF}$ is satisfied as shown in FIG. 5, then a predetermined current can flow in the arc region 6. The output current flowing in the arc region 6 can be varied by changing the setting of the variable resistor 10.

The conventional DC arc welding apparatus described above has a constant current characteristic whereby the output current remains constant even if the load is changed, and is therefore applicable to the field of TIG welding, for example, employing a non-consumable electrode. In most cases where consumable electrodes are used, a welding apparatus having a constant voltage characteristic is employed in which the welding is stable with the arcs being self-controlled and maintained constant in length. With a welding apparatus having a constant current characteristic it is difficult to self-control the arcs, and even if the arc length is changed manually by shaking or the like, it is difficult to restore the arc length change in a short time. Accordingly, when the electrode is consumable it is necessary that the arc length change is detected from the arc voltage in order to control the feed rate of the consumable electrode. Most electrode feed motors have a slow response characteristic, however, and it is therefore necessary to employ an expensive pulse motor or the like which has an excellent response characteristic.

Furthermore, the employment of a constant current welding apparatus in a consumable electrode type of welding operation is disadvantageous in that the circuitry involved is intricate and therefore high in manufacturing cost.

SUMMARY OF THE INVENTION

Accordingly, an object of this invention is to provide a DC arc welding apparatus having a constant voltage characteristic, and which is simple in construction.

A more specific object of the invention is to provide a constant voltage DC arc welding apparatus capable of decreasing the quantity of welding sputters of a relatively large size, thereby producing a greatly improved welding condition.

A further object of the invention is to provide a DC arc welding apparatus in which the welding current rise and fall rates can be readily controlled.

The foregoing and other objects of the invention are achieved by the provision of a DC arc welding apparatus which comprises a DC power source for supplying current between a welding electrode and a material to be welded through a switching element, a comparator for comparing the voltage detected across the welding electrode and material to be welded with a predetermined set voltage to provide a difference signal therebetween, and a current detecting element for detecting the current flowing between the welding electrode and material to be welded. A current control circuit subjects a signal proportional to the detected current and the difference signal from the comparator, which corresponds to a predetermined set current, to comparison to provide a control signal, and a drive circuit receives the control signal and correspondingly controls the on-off operation of the switching element.

DETAILED DESCRIPTION OF THE PREFERRED EMBODIMENTS

Figure 1:
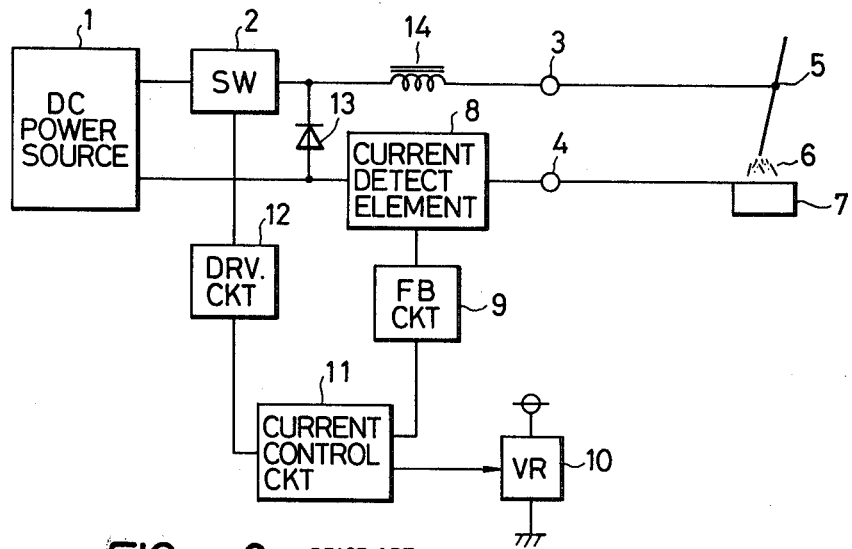
FIG. 1 is a block diagram of a conventional DC arc welding apparatus.
Figure 2:
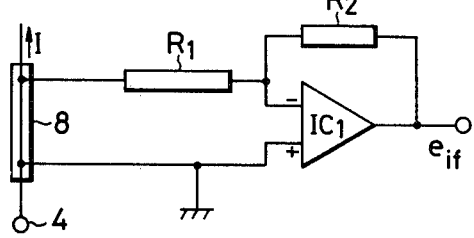
FIG. 2 is a circuit diagram showing one example of an output current feedback circuit for the apparatus of FIG. 1.
Figure 3:
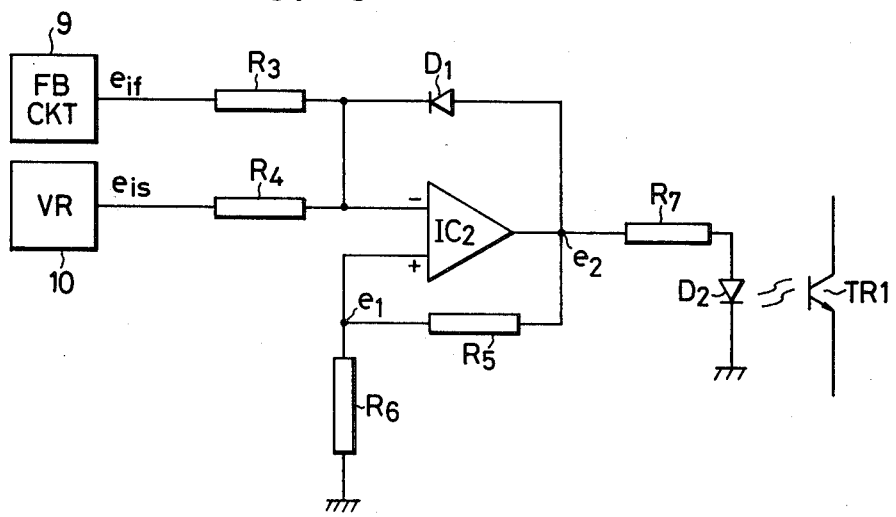
FIG. 3 is a circuit diagram showing one example of a current control circuit for the apparatus of FIG. 1.
Figure 4:
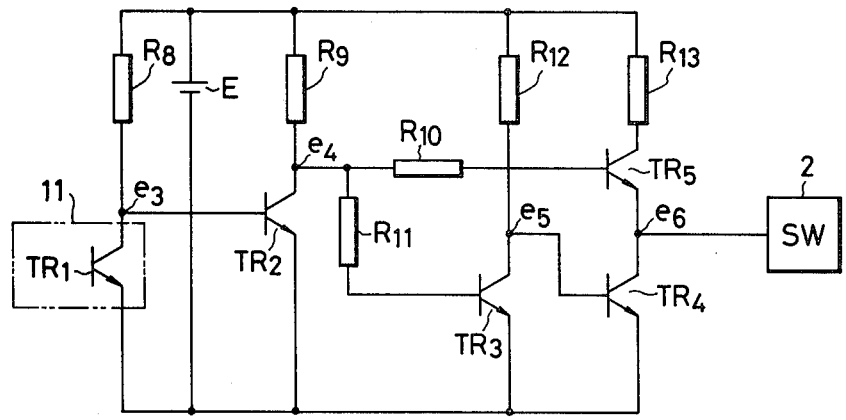
FIG. 4 is a circuit diagram showing one example of a drive circuit for the apparatus of FIG. 1.
Figure 5:
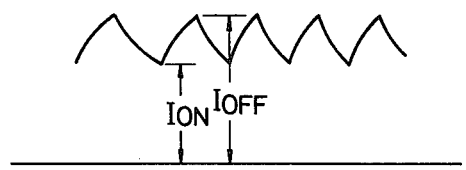
FIG. 5 is a diagram showing a typical output current waveform in the conventional apparatus.
Figure 6:
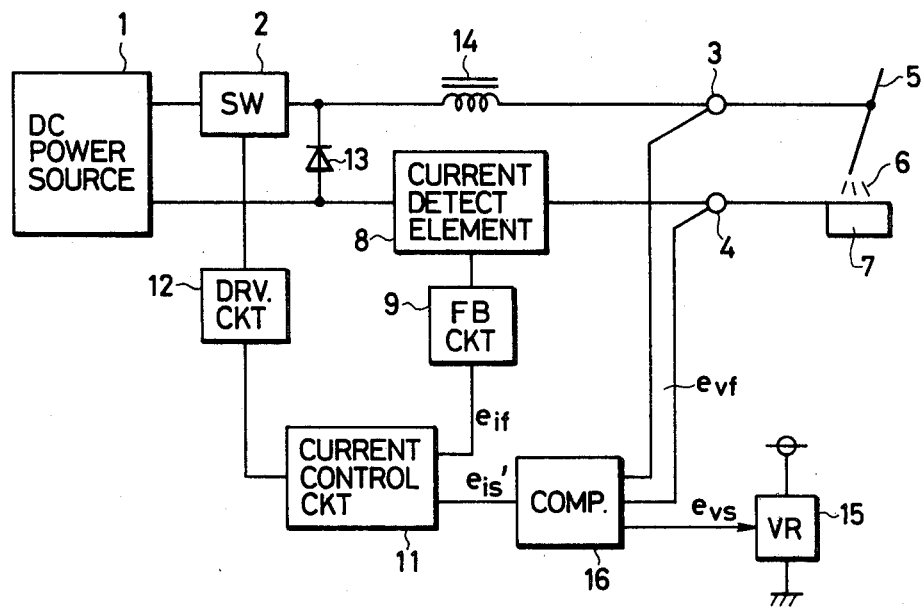
FIG. 6 is a block diagram showing one example of a DC arc welding apparatus according to this invention.

A first example of a DC arc welding apparatus according to this invention is shown in FIG. 6, wherein those components which have been previously described with reference to FIG. 1 are similarly numbered. In addition, reference numeral 15 designates a variable resistor across which a predetermined voltage is applied, and 16 is a comparator in which the output voltage across terminals 3 and 4 and the set signal provided by the variable resistor 15 are subjected to comparison, integration and amplification. In other words, an output voltage feedback circuit has been added to the conventional circuit shown in FIG. 1, to thereby control the currents $I_{ON}$ and $I_{OFF}$ when the switching element is rendered conductive and non-conductive.

Figure 7:
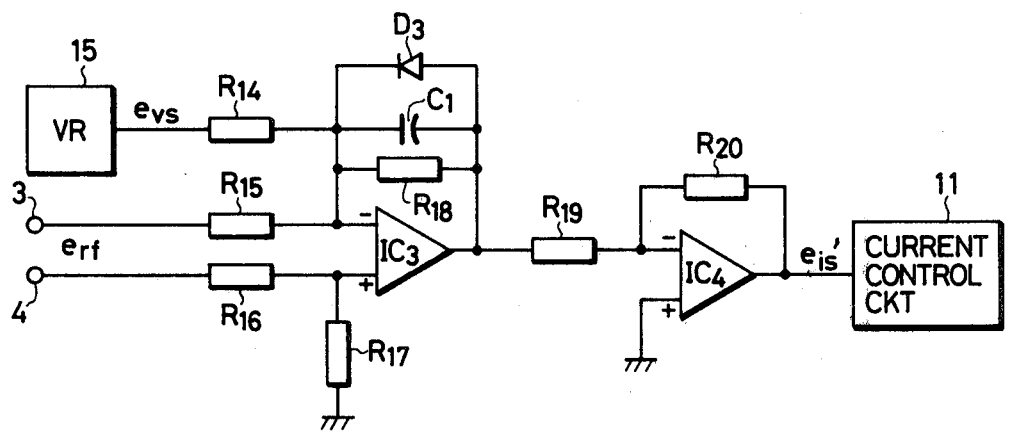
FIG. 7 is a circuit diagram showing one example of a comparator for the apparatus of FIG. 6.

The comparator 16, as shown in FIG. 7, comprises resistors $R_{14}$ through $R_{20}$, amplifiers $IC_3$ and $IC_4$, a capacitor $C_1$, and a diode $D_3$. A voltage $e_{vs}$ provided by the variable resistor 15 is applied to the inverting input terminal of amplifier $IC_3$, to which output terminal 3 is also connected through resistor $R_{15}$. Output terminal 4 is connected through resistor $R_{16}$ to the non-inverting input terminal of the amplifier, which is grounded through resistor $R_{17}$. A parallel circuit made up of diode $D_3$, capacitor $C_1$ and resistor $R_{18}$ is connected between the output and inverting input terminals of amplifier $IC_3$. The output terminal of the amplifier is connected through resistor $R_{19}$ to the inverting input terminal of amplifier $IC_4$, the non-inverting input terminal of which is grounded. The inverting input terminal of amplifier $IC_4$ is also connected through resistor $R_{20}$ to the output terminal of the amplifier. The output signal $e_{is'}$ of amplifier $IC_4$ is applied to the current control circuit 11. Since the feedback signal $e_{vf}$ changes abruptly in response to arc load, the capacitor $C_1$ is provided between the inverting input and output terminals of amplifier $IC_3$ so that its output signal will not respond to momentary abrupt changes in the feedback signal, thus forming an integration circuit.

In operation, the detection signal $e_{vf}$ of the output voltage across terminals 3 and 4 and an output voltage set signal $e_{vs}$ from the variable resistor 15 are subjected to comparison, integration and amplification in the comparator 16. The output signal $e_{is'}$ of the comparator and the signal $e_{if}$ from the feedback circuit 9 are then subjected to comparison and amplification in the control circuit 11, whereby the output currents $I_{ON}$ and $I_{OFF}$ and the average output current are controlled.

In the conventional circuit shown in FIG. 1, the output current set signal $e_{is}$ is constant irrespective of the load between the output terminals 3 and 4. In the circuit shown in FIG. 6, on the other hand, the output signal $e_{is'}$ of the comparator 16, which corresponds to the set signal $e_{is}$ in the conventional circuit, changes as a function of the output voltage detection signal $e_{vf}$. Thus, when the actual output voltage value is smaller than that set by the variable resistor 15, the output signal $e_{is'}$ of the comparator 16 is increased, and the output current is increased. In contrast, when the actual output voltage value is larger than that set by the variable resistor 15, the output signal $e_{is'}$ of the comparator 16 is decreased, and the output current is decreased.

As described above, the actual output voltage is fed back and compared with the desired or set output voltage to control the output current. Accordingly, the welding apparatus of the invention has a constant voltage characteristic whereby, even if the load between the output terminals 3 and 4 varies, the output voltage is maintained unchanged.

Figure 8:
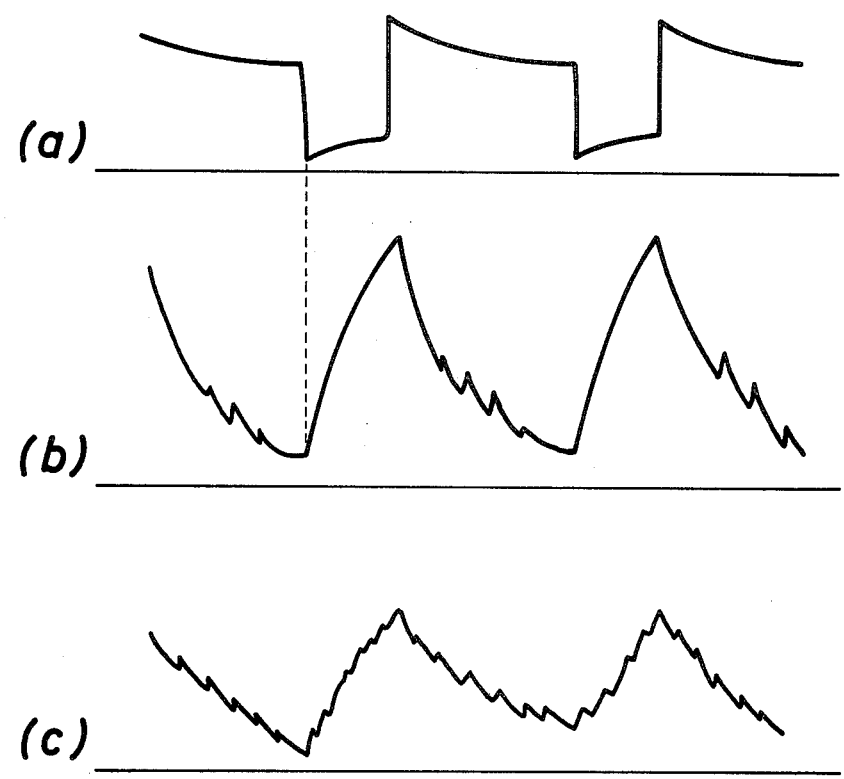
FIG. 8($a$) is a waveform diagram showing a typical arc voltage in the case when welding is carried out with a consumable electrode, FIG. 8($b$) is a waveform diagram showing a welding current in the case when a large quantity of sputters are generated, and FIG. 8($c$) is a waveform diagram showing a welding current in the case when sputters are scarcely formed.

FIG. 8($a$) shows a typical arc voltage waveform in the case where welding is carried out with a consumable electrode. As is apparent, the load changes frequently and abruptly in a consumable electrode welding operation. For instance, in the case of a short-circuit transfer welding operation, a short-circuiting state and an arcing state are repeated, and accordingly the voltage is changed. In the case where, as shown in FIG. 8($b$), the welding current is changed abruptly by the variation of the load, the peak value of the welding current increases considerably, which results in the formation of a large quantity of sputters of relatively large size. Therefore, if an integration and amplification (or delay) function is provided in the comparator 16 the output current change can be moderated even if the output voltage and load both change abruptly, as indicated in FIG. 8(c). In this case, the generation of sputters is greatly reduced.

Figure 9:
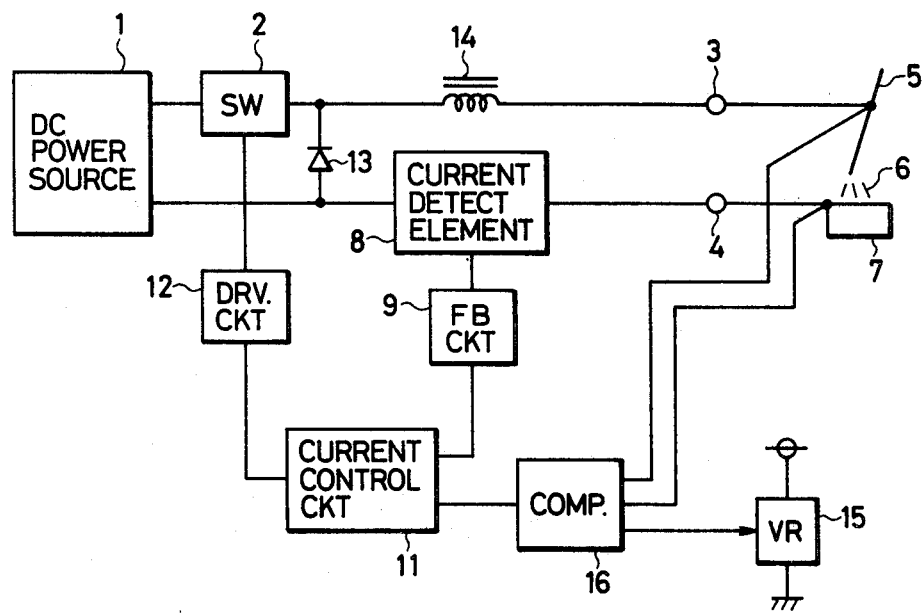
FIG. 9 is a block diagram showing a second example of a DC arc welding apparatus according to the invention.

In the above-described apparatus, the output voltage feedback is effected between the output terminals 3 and 4; however, the output voltage may also be detected in the vicinity of the arc region 6 as shown in FIG. 9.

Figure 10:
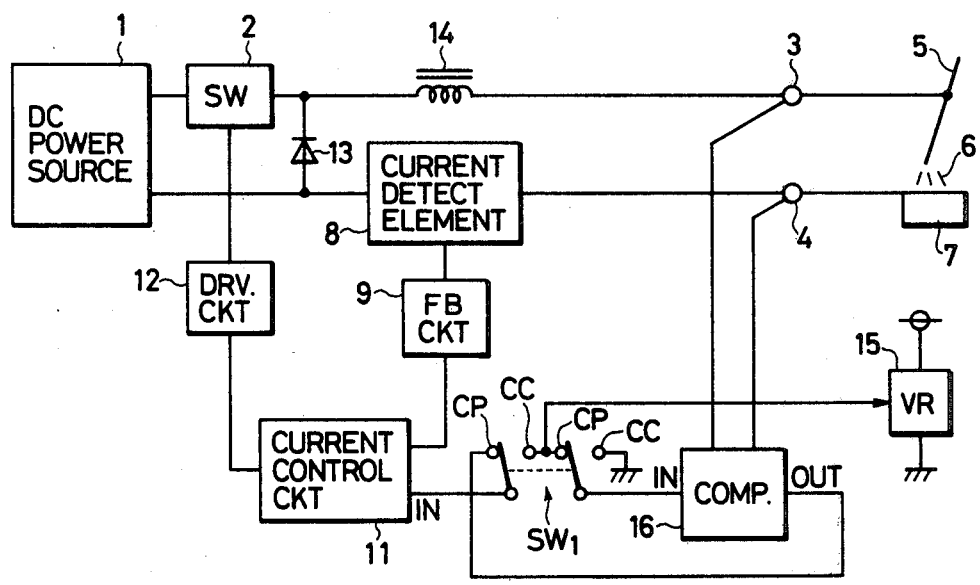
FIG. 10 is a diagram showing an arrangement of a welding apparatus having either a constant current or a constant voltage characteristic.

FIG. 10 shows an arrangement in which a constant voltage characteristic welding apparatus and a constant current characteristic welding apparatus can be selectively employed. A double-pole double-throw switch SW1 is connected between the variable resistor 15 and the comparator 16 and between the comparator 16 and the current control circuit 11, respectively. In this case, the welding characteristics can be readily switched by selectively tripping the armature of this switch over to the terminals CP for a constant voltage characteristic and to the terminals CC for a constant current characteristic.

The above-described circuitry may also be modified such that the comparator 16 is used merely as a comparator and amplifier circuit, and the rise of the output current is controlled by increasing the value of the DC reactor 14.

As is apparent from the above description, according to the invention, the output voltage detection signal and the output voltage set signal are subjected to comparison and amplification, and their resultant signal controls the output current. Therefore, a DC arc welding apparatus having a constant voltage characteristic according to the invention is relatively low in manufacturing cost and high in welding accuracy.

What is claimed is:

1. A DC welding apparatus comprising:
   (a) a DC power source (1) for supplying current between a welding electrode (5) and a material (7) to be welded through a switching element (2);
   (b) a comparator (16) for comparing a voltage detected across said welding electrode and material to be welded with a predetermined set voltage, to provide a first difference signal therebetween; said comparator comprising circuit means for delaying the difference signal;
   (c) a current detecting element (8) for detecting the current flowing between said welding electrode and said material to be welded;
   (d) a current control circuit (11) for subjecting a signal proportional to the detected current and the delayed difference signal from said comparator, which corresponds to a predetermined set current, to comparison to derive a control signal; and
   (e) a drive circuit (12) for said switching element, said drive circuit being responsive to said control signal to control the on-off operation of said switching element to maintain a constant arc voltage and reduce the number of welding sputters.

2. An apparatus as claimed in claim 1, in which said switching element comprises at least one power transistor.

3. An apparatus as claimed in claim 1, in which said set voltage is preset by a voltage setting unit (15).

4. An apparatus as claimed in claim 3, in which said voltage setting unit comprises a variable resistor.

5. An apparatus as claimed in claim 1 wherein said circuit means comprises an integration circuit for integrating said first difference signal and, thereby, delaying the response of said comparator thereto and controlling the rise and fall rates of the welding current.

6. An apparatus as claimed in claim 5 wherein said integration circuit comprises a capacitor ($C_1$).

7. An apparatus as claimed in claim 6 wherein said integration circuit further comprises an inverting amplifier ($IC_3$), said capacitor ($C_1$) being connected in a feedback path between the output and input of said amplifier.

* * * * *